United States Patent [19]

McNamara

[11] Patent Number: 5,216,930
[45] Date of Patent: Jun. 8, 1993

[54] POWER WORK ARM

[75] Inventor: Jeffrey S. McNamara, Grosse Ile, Mich.

[73] Assignee: Litton Industrial Automation Systems, Inc., Florence, Ky.

[21] Appl. No.: 923,084

[22] Filed: Jul. 31, 1992

[51] Int. Cl.⁵ .............................................. B25J 18/00
[52] U.S. Cl. .................................... 74/469; 74/106; 414/680; 901/15; 901/27
[58] Field of Search ............... 414/680, 739, 469; 901/15, 22; 74/102, 105, 106, 107, 479 B

[56] References Cited

U.S. PATENT DOCUMENTS

| | | | |
|---|---|---|---|
| 709,167 | 9/1902 | Martin | 74/106 |
| 3,221,568 | 12/1965 | Ross | 74/106 |
| 4,559,839 | 12/1985 | Legille et al. | 74/106 X |
| 4,613,276 | 9/1986 | Blatchford | 74/106 X |
| 4,706,511 | 11/1987 | Houston | 74/102 X |

OTHER PUBLICATIONS

Ingenious Mechanisms, vol. 1, Industrial Press Inc., 1968, pp. 391-392.

Primary Examiner—Michael S. Huppert
Assistant Examiner—Donald W. Underwood
Attorney, Agent, or Firm—Barnes, Kisselle, Raisch, Choate, Whittemore & Hulbert

[57] ABSTRACT

A device with a pivoting work arm for carrying and positioning a tool which is moved by a modified Watts linkage powered by a linear actuator having a true straight line motion. The modified Watts linkage has relatively short links resulting in the center of the middle link following an arcuate path. The center of the middle link is drivingly connected to the linear actuator by a pivoting link or a cam. To provide shock absorption for the work arm as it reaches its fully extended position, the modified Watts linkage is coupled to a follower arm yieldably biased by a spring.

7 Claims, 5 Drawing Sheets

POWER WORK ARM

FIELD

This invention relates to an apparatus for positioning a tool or the like and more particularly to an apparatus having a movable work arm.

BACKGROUND

There are many previously known devices for positioning tools, welding guns and the like for mass production machining and assembly operations.

Some previously known lift and carry workpiece transfer mechanisms have used a so-called Watts linkage drive to raise and lower the workpieces.

A Watts linkage is a three link kinematic mechanism which has three long links pivotally connected together at adjacent ends with the remaining ends of two of the links pivoted about spaced apart and fixed pivot points. The links are constructed and arranged with a geometry that produces an essentially linear reciprocating motion of the center of the middle link. It is well understood that in a Watts linkage the links must be relatively long to produce this linear motion.

Because the links do not move in a true straight line, a Watts linkage is not driven or powered by an actuator producing a straight line or rectilinear motion.

SUMMARY

Pursuant to this invention, a work arm device for positioning a tool is moved in an arc by a modified Watts linkage powered by an actuator having a true straight line motion. To provide a compact device, the Watts mechanism has relatively short links resulting in the center of the middle link following an arcuate path which is drivingly connected to a linear actuator by a pivoting coupling such as a short link or a cam.

Preferably to provide shock absorption for the work arm as it reaches its fully extended position, the modified Watts linkage also has a follower arm yieldably biased by a spring adjacent one end.

Objects, features and advantages of this invention are to provide a device having a movable work arm for positioning a tool which provides arcuate motion of the work arm utilizing a simple linear actuator, readily moves and positions a heavy or massive tool, has a smooth and yet relatively rapid accelerating and decelerating motion when moving the arm to its retracted and extended positions, and is compact, rugged, durable, of relatively simple design and economical manufacture and assembly and in service has a long useful life and requires little maintenance.

DETAILED DESCRIPTION

Figure 1:
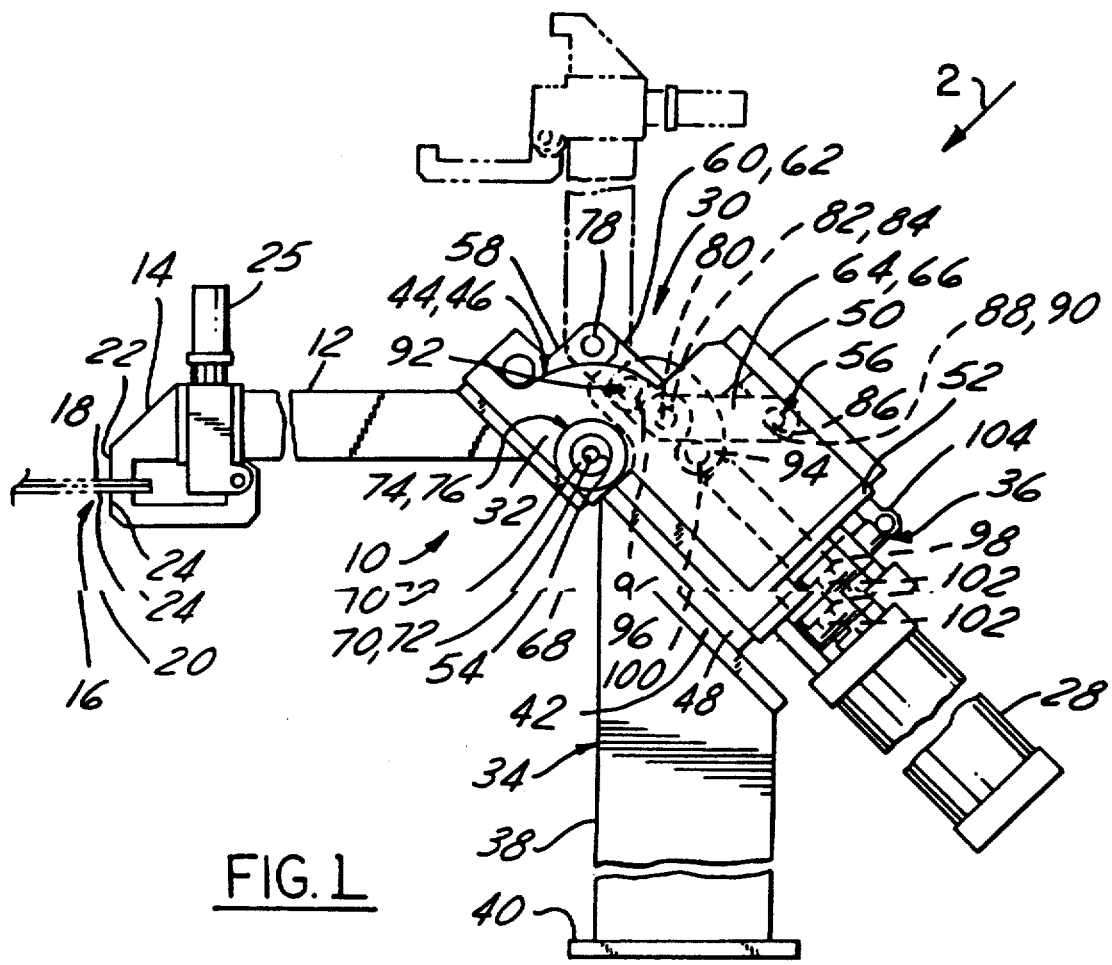
FIG. 1 is a side view of a device embodying this invention with a pivotally movable arm carrying a welding gun and driven by an air actuated cylinder.
Figure 2:
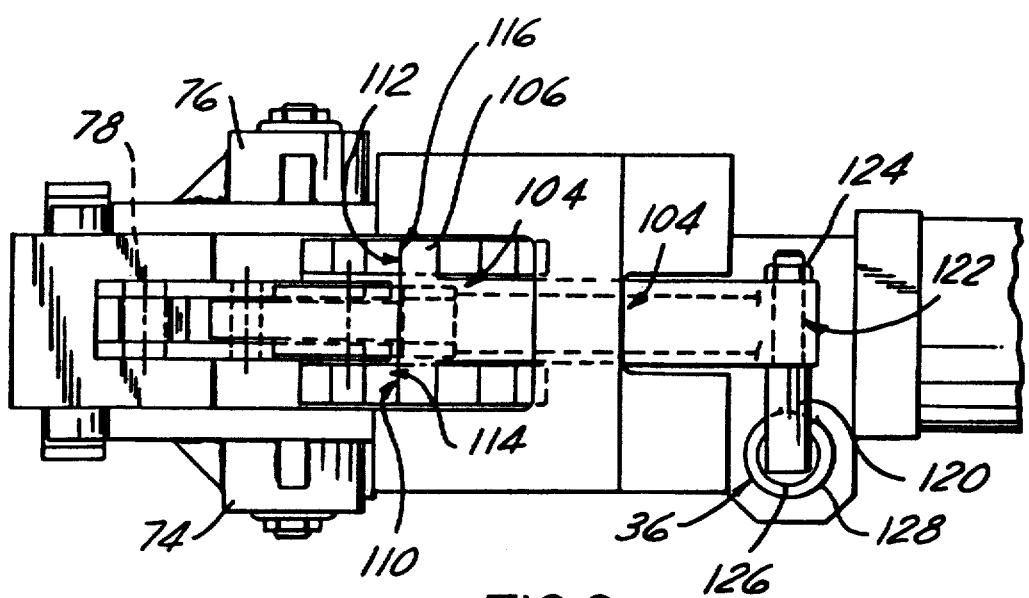
FIG. 2 is a fragmentary top view of the device in the direction of the arrow 2 in FIG. 1.

FIG. 1 illustrates a device 10 embodying the invention with a work arm 12 pivotally movable to extended and retracted positions to move a clamp 14 or other tool into and out of a work station 16. In the work station, a pair of steel sheets 18 and 20 are held together by the clamp. The clamp has a pair of arms 22 and 24 providing a backup and a press foot between which the sheets are clamped. The lever arm 24 is pivotally mounted and actuated by a drive cylinder 25 to engage the steel sheets 18 and 20 and thereby hold them in the correct position for an assembly operation such as welding.

The work arm 12 is driven by a preferably air (pneumatic) actuated cylinder 28 through a linkage assembly 30 received in a housing 32 mounted on a pedestal 34. To insure smooth movement of the arm into and out of its fully advanced position, it is operably connected through the linkage to a shock absorber assembly 36.

The pedestal has an upright 38 fixed at one end to a base plate 40 and at the other end to an inclined mounting plate 42 to which the housing 32 is secured. The housing has side plates 44 and 46 joined by a base plate 48 and an H-shaped top plate 50. The top plate 50 provides clearance for articulation of the linkage assembly 30 and the shock absorber 36. The cylinder 28 is mounted on an end plate 52 attached to the side plates. The linkage 30 is carried and retained within the housing 32 by a first pivot 54 and a second pivot 56 each fixed to the side plates 44 and 46.

In accordance with this invention, the work arm 12 is moved to its extended and retracted positions by a modified Watts linkage assembly 30 having a first link 58 to which the work arm is attached for movement in unison therewith, a pair of second links 60, 62, and a pair of third links 64, 66. The first link 58 is pivotally mounted in the housing by a pivot shaft 68 journalled for rotation in a pair of bearings 70, 72 received in collars 74, 76 fixed to the side plates 44, 46. The second links 60, 62 are pivotally connected adjacent one end to the first link by a pivot pin 78 and pivotally connected adjacent the other end to the pair of third links 64, 66 by a pivot pin 80. The pin 80 is journalled for rotation in thrust bearings 82, 84, received in the second links, and is secured to the third links. Adjacent the other end, the third links are pivoted on a pin 86 journalled for rotation in bearings 88, 90 received in the third links and fixed to the housing side plates 44, 46. All three of these links are relatively short, preferably each of substantially the same length, and each has a longitudinal length between the centers of its pivots which is less than 10 inches, desirably 3 to 6 inches, and preferably about 3½ to 4½ inches.

To accommodate the arcuate movement of a mid point 92 of the second links 60, 62, they are operably connected to the power cylinder 28 through a fourth link 94. The fourth link is pivotally connected adjacent one end to the mid point 92 of the pair of second links by a pivot pin 96 and is pivotally connected adjacent the other end to an extension bar 98 by a pivot pin 100. The other end of the extension bar is rigidly connected to the piston rod 102 of the cylinder 28 for movement in unison therewith. The fourth link has a generally U-shape to provide clearance for the pivotal connection between the second and third links. Preferably, this fourth link is also relatively short and has a longitudinal length between the centers of its pivots which is not greater than about 8 inches, desirably 3 to 6 inches, and preferably about 3½ to 4½ inches.

Figure 3:
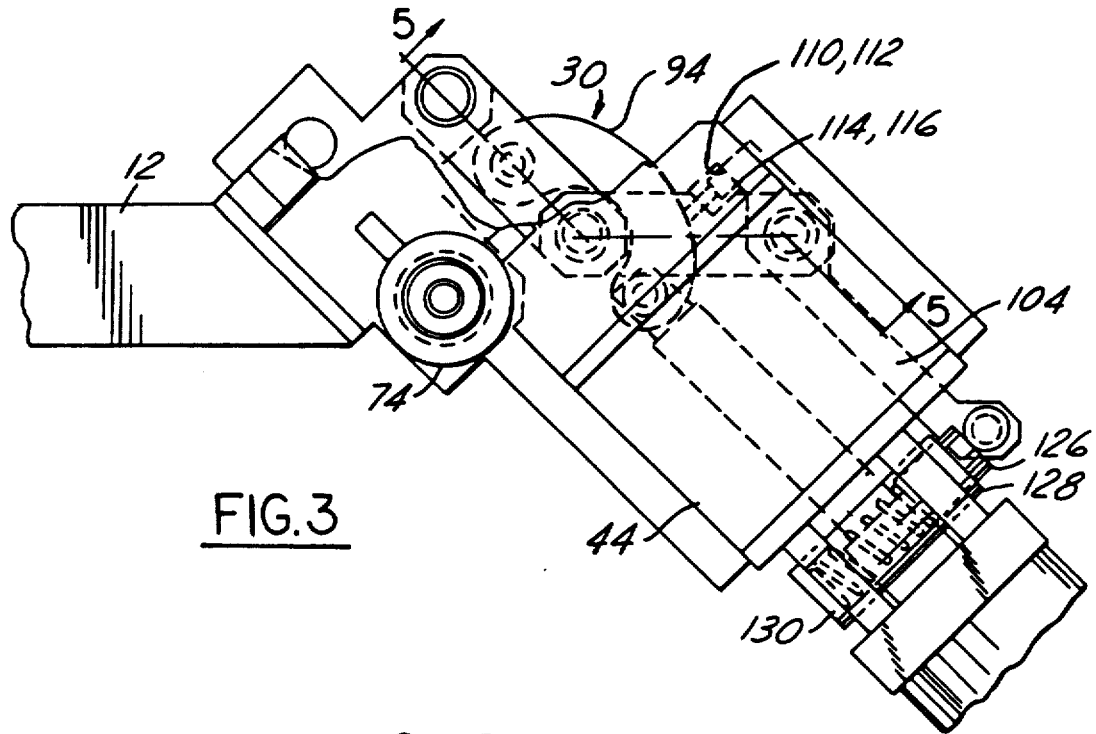
FIG. 3 is an enlarged and fragmentary side view with portions broken away of the device of FIG. 1 illustrating some of the linkage operably connecting the arm with the drive cylinder and showing the arm in its fully extended position.
Figure 4:
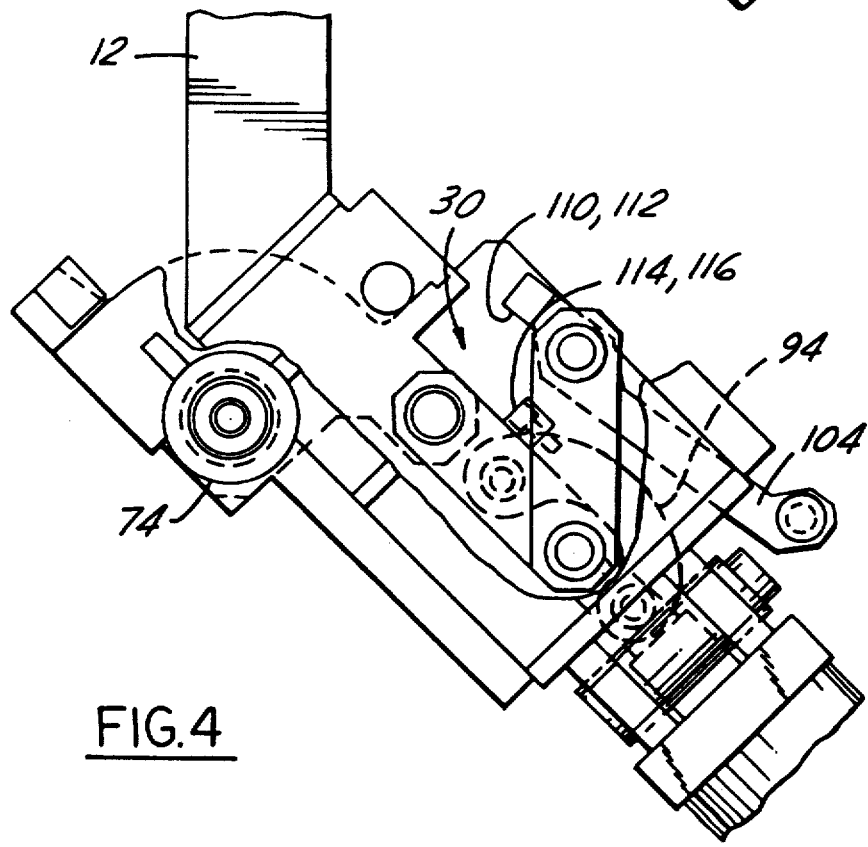
FIG. 4 is a fragmentary side view with portions cut away similar to FIG. 3 and illustrating the position of the connecting linkage when the arm is in its fully retracted position.

In accordance with another feature of this invention, to insure smooth and rapid movement of the work arm 12 adjacent its fully extended position, the shock absorber 36 is operably connected to the drive linkage 30 through a fifth link, or follower arm 104, received between the third links 64, 66 and journalled on the pivot pin 86. To operably connect the drive linkage with the shock absorber upon the work arm approaching its fully extended position, the arm 104 has a T-shaped portion 106 at one end with abutment surfaces 110, 112. These abutment surfaces engage with corresponding abutment surfaces on wear blocks 114, 116 secured respectively on each third link. The abutment surfaces on the lever arm 104 and corresponding abutment surfaces on each third link are constructed and arranged to engage as the work arm 12 moves adjacent its fully extended position, as depicted in FIG. 3. As the work arm is moved away from the fully extended position, the abutment surfaces disengage, as depicted by the fully retracted position shown in FIG. 4.

As the work arm approaches the fully extended position, the lever arm 104 pivots about the pin 86 and transmits force to the shock absorber 36 through a cross pin 120 with a reduced shank received in a hole 122 and secured by a nut 124 to the arm. The pin forcibly engages a plunger 126 slidably received in a housing 128 and yieldably biased by a spring 130 toward its extended position. Rotation of the lever arm displaces the plunger and compresses the spring to provide shock absorption as the work arm 12 and clamp 14 approach their fully extended position.

Figure 5:
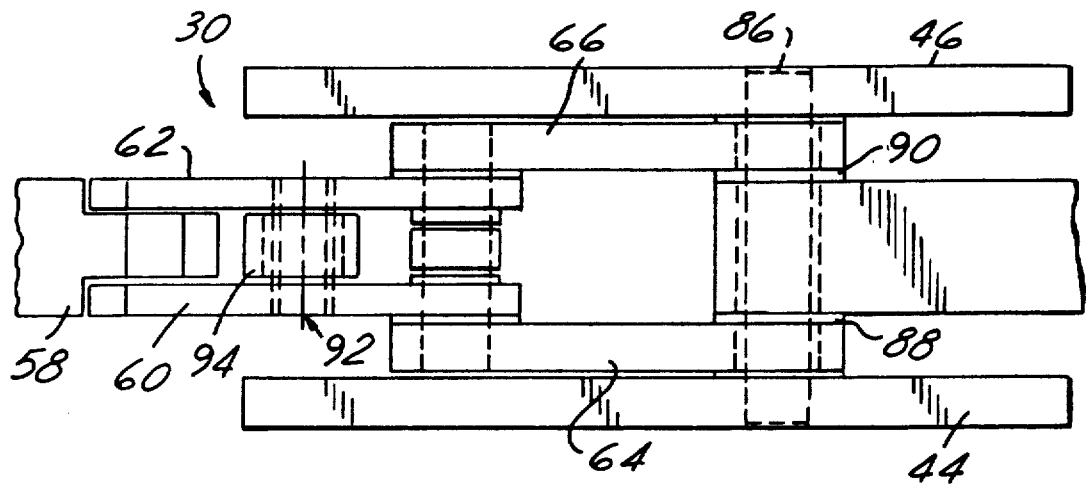
FIG. 5 is an enlarged, fragmentary and somewhat diagrammatic top view along 5—5 of FIG. 3 illustrating some of the linkage of the device.
Figure 6:
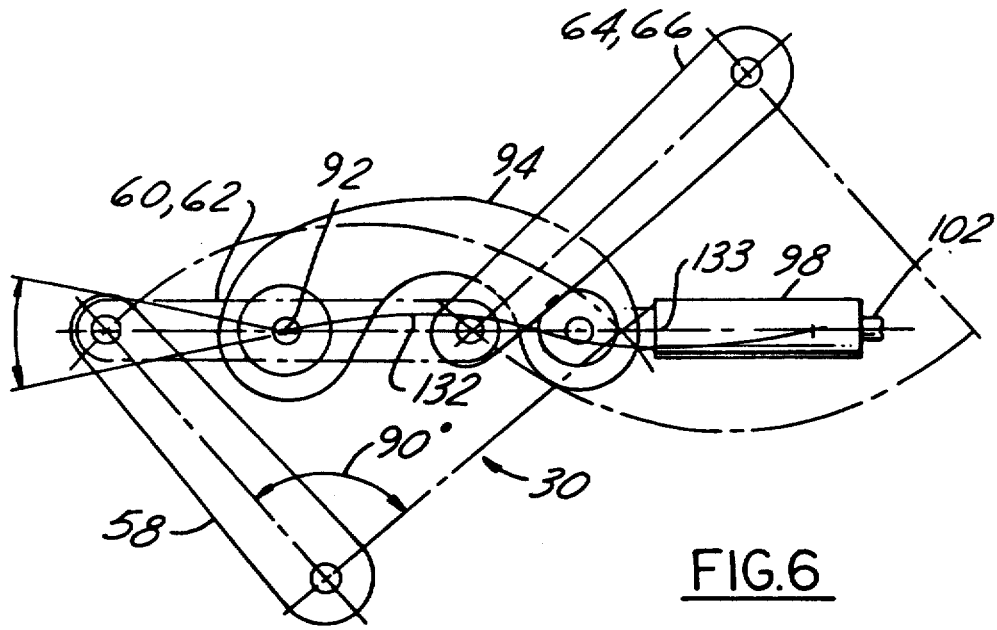
FIG. 6 is a diagrammatic side view illustrating the motion of the linkage of the device.

FIGS. 5 and 6 provide a simplified representation of the linkage 30 of FIGS. 1–4 to better depict the arrangement and motion of its components. In FIG. 6, the linkage is shown in the fully extended position with the paths of motion of selected pivot points traced through the full range of motion of the linkage. As seen in FIG. 6, the arcuate reciprocating motion of the mid-point 92 of the second links 60, 62 between the fully extended and fully retracted positions is along the path 132. This arcuate path has a longitudinal axis of symmetry 133 which is preferably coincident with the longitudinal axis of the piston rod 102 of the cylinder 28. Rectilinear motion of the extension bar 98 and piston rod 102 of the cylinder 28 imparts pivotal and axial motion to the fourth link 94 and produces motion of the mid-point 92 of the second links along the path 132, driving the linkage and the work arm 12 as the actuator cylinder applies force to the bar 98.

Figure 7:
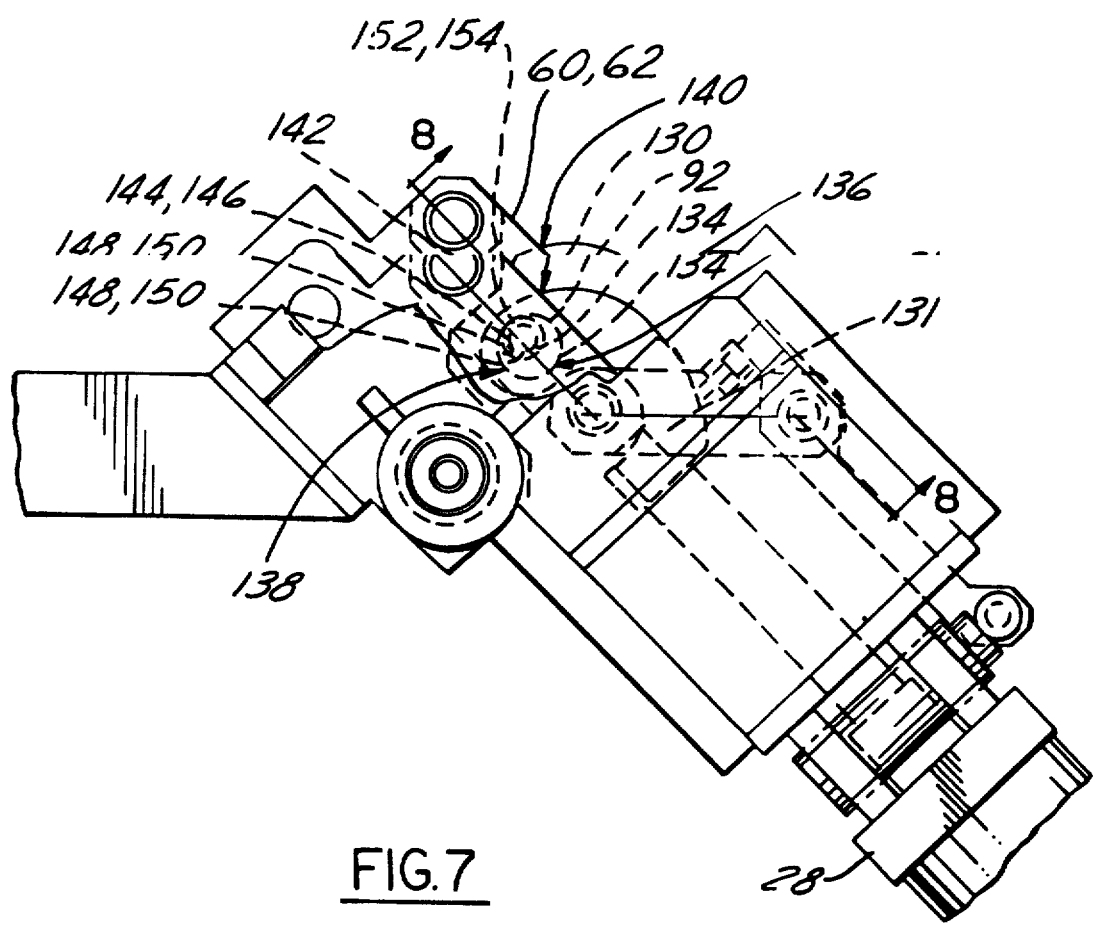
FIG. 7 is an enlarged and fragmentary side view with portions broken away of an alternative embodiment of the device shown in FIGS. 1–6 utilizing an eccentric cam to operably connect the arm with the drive cylinder, and showing the arm in the fully extended position.
Figure 8:
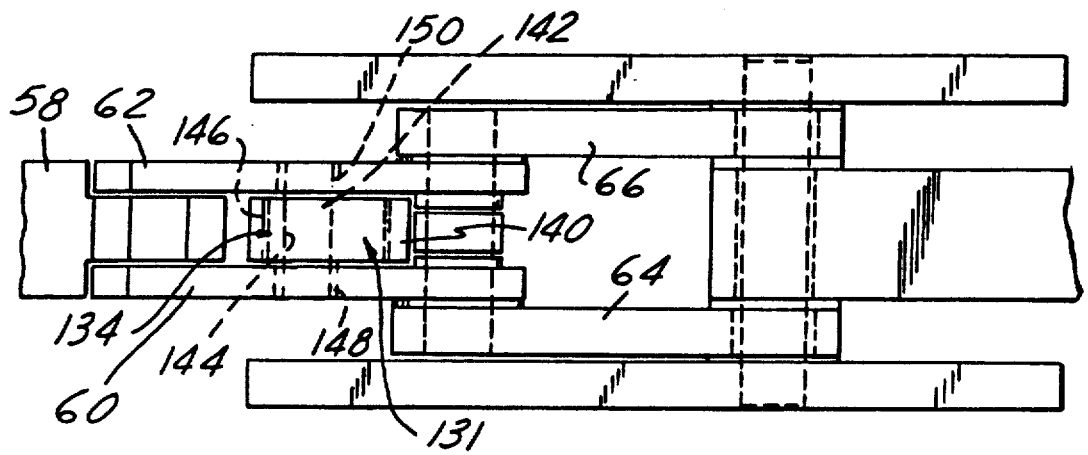
FIG. 8 is an enlarged, fragmentary and somewhat diagrammatic top view along 8—8 of FIG. 7 illustrating some of the linkage of the device.
Figure 9:
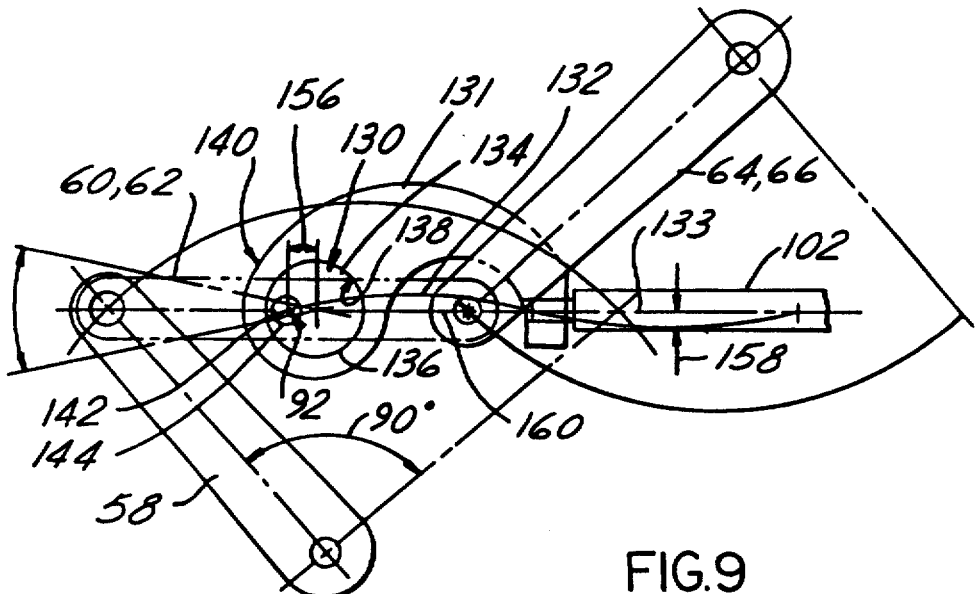
FIG. 9 is a diagrammatic side view of the embodiment of FIG. 7 illustrating the motion of the linkage of the device.

In accordance with another embodiment of this invention, FIGS. 7–9 show an eccentric cam link assembly 130 and a curvilinear extension bar 131 in lieu of the pivotal fourth link 94. The cam assembly operably connects the linkage about the mid-point 92 of the second links 60, 62 to the piston rod 102 of the cylinder 28. The curvilinear extension bar is rigidly fixed to the piston rod 102, and moves along a rectilinear path 133. Pivotal motion between extension bar 131 and the linkage is produced by a cam cylinder 134 coaxially received in a bore 136 in an end portion 140 of the extension bar 131 and a follower pin 142. The follower pin 142 is received in a bore 144 offset from the center of the cam cylinder and connected to the second links 60,62 of the Watts linkage with its axis coincident with the mid point 92 of these links. Preferably, the cam cylinder is journalled in a bearing 146 and the follower pin 142 is journalled in bearings 148 and 150 in both the second links, respectively.

In use, pivotal motion of the cam cylinder 134 is produced by the offset 156 of the follower pin from the center of the cam cylinder. Preferably, the offset 156, which is the distance between the center of the follower pin and the center of the cam cylinder, is at least three times greater than the maximum transverse offset 158 between the axis of symmetry 133 and the path 132 of motion of the mid point 92 of the second links. For a given offset dimension 158 of 0.080 inches, an exemplary offset dimension 156 for the follower pin would be 0.250 inches. This 3:1 ratio provides a guideline to limit the angular rotation of the cam cylinder, and effectively limits the amount of lateral force produced between the extension bar 132 and the second links 62, 64. This lateral force produces bending moments on the curvilinear extension bar, piston rod and cylinder, when the follower pin 142 is positionally offset from the rectilinear path of the axis of the cam cylinder. Preferably, the cylinder bearing 146 is a Dixon bearing #CJ22E24-T and the second link bearings 148, 150 are a pair of Dixon bearings #CJ10E14-6.

The power work arm of this invention uses a simple and readily available rectilinear actuating means to couple and drive a modified Watts linkage having short links by using a pivotal link coupling the center of the middle link of the modified Watts linkage with the rectilinear motion of the air actuator cylinder. A follower arm with a spring cushion provides shock absorption for the smooth positioning of a work arm and tool as it moves to its fully extended position. This provides a self contained package which is compact, may be a standardized unit, and has an accurate, simplified and precise driving articulation of a work arm and tool through an economical coupling engagement with a simplified and readily available rectilinear air actuator cylinder to produce a simple arcuate motion of a tool mounted at the end of a work arm.

What is claimed is:

1. A power work arm device comprising:
    a base;
    a first pivot carried by said base;
    at least one first link with one end pivotally connected to said first pivot and the other end free to oscillate about said first pivot at its outer end;
    a second pivot carried by said base and spaced from said first pivot;
    at least one second link with one end pivotally connected to said second pivot and the other end free to oscillate about said second pivot at its outer end;

at least one third link pivotally connected to each of said first and second links at positions spaced from said first and second pivots, respectively and free to oscillate about said first and second pivots and having a third pivot connecting said first and third links and a fourth pivot connecting said second and third links;

a linear actuator producing a true straight line motion;

a coupling pivotally connected to the mid point of said third link and pivotally connected to said linear actuator at a point spaced from said mid point;

said linear actuator being carried by said base and positioned so that its path of linear movement is substantially parallel to and coincident with the axis of symmetry of the arcuate path of motion of the center of said third link to couple the true straight line motion of said linear actuator with said arcuate path of motion of said center of said third link;

said first and second pivots being disposed on opposite sides of the path of the true straight line motion of said linear actuator; and a work arm attached to said first link for pivotal movement therewith about said first pivot to provide arcuate motion of said work arm relative to said base.

2. The power work arm device of claim 1 which also comprises:

a lever arm pivotally carried by said base intermediate spaced apart first and second ends of said lever arm, said first end being operably connected with said linkage to pivot said lever arm at least as said work arm approaches its fully extended position, and a spring communicating with said second end and carried by said base, whereby a shock absorber is provided as said work arm approaches the fully extended position.

3. The power work arm device of claim 1 wherein said coupling comprises a cam assembly having, a cylindrical cam body carried by said linear actuator, a follower pin carried by said cam body and connected to said third link with its axis coincident with the mid point of said third link, and said axis of said follower pin being parallel to and offset from the axis of said cam cylinder.

4. The power work arm device of claim 1 wherein each of said first, second and third links are less than 10 inches in length, providing for a compact linkage having relatively short links.

5. The power work arm device of claim 1 wherein each of said first, second and third links are less than 6 inches in length, providing for a compact linkage having relatively short links.

6. The power work arm device of claim 1 wherein said coupling comprises, a fourth link pivotally connected adjacent one end to the mid point of said third link and pivotally connected adjacent the other end to said linear actuator at a point spaced from said mid point.

7. The power work arm of claim 3 wherein the distance between the axis of said follower pin and the axis of said cam cylinder is at least three times greater than the maximum transverse offset between the arcuate path of motion of the center of said third link and the true straight line motion of said linear actuator.

* * * * *

UNITED STATES PATENT AND TRADEMARK OFFICE
CERTIFICATE OF CORRECTION

PATENT NO. : 5,216,930
DATED : June 8, 1993
INVENTOR(S) : Jeffrey S. McNamara

It is certified that error appears in the above-indentified patent and that said Letters Patent is hereby corrected as shown below:

<u>In Figure 1</u> of the drawings: Reference numerals 24, 70, 72, 96 and 102 have been duplicated and misprinted as a result of a printing error.

<u>In Figure 7 of the drawings</u>: Reference numerals 148, 150 and 134 have been duplicated and misprinted as a result of a printing error.

Signed and Sealed this

Fourteenth Day of March, 1995

Attest:

BRUCE LEHMAN

*Attesting Officer*    *Commissioner of Patents and Trademarks*